Patented May 27, 1924.

1,495,613

UNITED STATES PATENT OFFICE.

CHRISTIAN ROSENTHAL, OF DETROIT, MICHIGAN.

LACQUER POLISH FOR VARNISHED SURFACES.

No Drawing. Application filed September 4, 1923. Serial No. 660,940.

*To all whom it may concern:*

Be it known that I, CHRISTIAN ROSENTHAL, a citizen of the United States of America, residing at Detroit, in the county of Wayne and State of Michigan, have invented certain new and useful Improvements in Lacquer Polish for Varnished Surfaces, of which the following is a specification.

The invention relates to lacquer polish for varnished surfaces and consists in the novel composition as hereinafter set forth. This composition comprises essentially a wax, a solvent therefor, such as kerosene, banana oil (amyl acetate) and japan drier. These ingredients are thoroughly mixed and the composition is then ready for use.

As an example of a polish containing these ingredients the following specific formula is preferably used:—

|  | Pounds. |
|---|---|
| Wax | 8 |
| Kerosene | 84 |
| Japan drier | 40 |
| Banana oil | 5 |

While the above formula has been found to produce a good furniture polish, I have found that it may still be improved by adding to the above formula a certain amount of varnish and in preparing this latter composition the specific formula is as follows:—

|  | Pounds. |
|---|---|
| Wax | 8 |
| Kerosene | 84 |
| Japan drier | 40 |
| Banana oil | 7½ |
| Varnish | 67 |

The kerosene used in the above formula constitutes the solvent for the wax and the product resulting from the mixture of the various ingredients is a composition which is fluid at ordinary temperatures.

In preparing the composition the wax is melted and the banana oil added thereto, while the other ingredients are mixed in a separate container and after heating to a suitable temperature are added to the wax and banana oil, thereby insuring a thorough commingling of all the ingredients.

The lacquer polish is adapted for use on waxed or varnished furniture, floors and automobiles and is applied to the surface in the usual manner and rubbed to impart a permanent luster. It is useful not only for producing a highly polished surface but also for restoring the finish.

What I claim as my invention is:—

1. A polish comprising a wax, a solvent therefor, banana oil and japan drier.

2. A polish comprising a wax, a solvent therefor, banana oil, japan drier and varnish.

3. A polish comprising a wax, kerosene, banana oil and japan drier.

4. A polish comprising a wax, kerosene, banana oil, japan drier and varnish.

5. A polish comprising ingredients in substantially the proportions specified: Wax 8 lbs; kerosene 84 lbs; japan drier 40 lbs; banana oil 5 to 7½ lbs.

6. A lacquer comprising the following ingredients in substantially the proportions specified: Wax 8 lbs; kerosene 84 lbs; japan drier 40 lbs; banana oil 7½ lbs; varnish 67 lbs.

In testimony whereof I affix my signature.

CHRISTIAN ROSENTHAL.